United States Patent Office 3,077,482
Patented Feb. 12, 1963

3,077,482
19-OXYGENATED STEROIDS AND PROCESS FOR THEIR MANUFACTURE
Albert Wettstein, Riehen, Georg Anner, Karl Heusler, and Jaroslav Kalvoda, Basel, and Hellmut Ueberwasser, Riehen, Switzerland, assignors to Ciba Corporation, a corporation of Delaware
No Drawing. Filed July 10, 1961, Ser. No. 122,656
Claims priority, application Switzerland July 15, 1960
20 Claims. (Cl. 260—397.1)

The present invention provides a process for the manufacture of 19-oxygenated and 19-nor-steroids from $\Delta^4$-3-oxo-6$\beta$:19-oxido-steroids.

19-nor-steroids, more especially certain derivatives of 19-nor-testosterone and 19-nor-progesterone, have attained considerable importance in recent years. Thus, for example, 19-nor-17$\alpha$-methyl-testosterone, 19-nor-17$\alpha$-ethinyl-testosterone and certain esters of 19-nor-testosterone have been accepted as therapeuticals.

All these compounds have been accessible hitherto only by reducing steroids containing an aromatic ring A, which in turn had to be prepared from unsaturated 3-keto-steroids by thermal elimination of the angular C–19-methyl group and simultaneous aromatization. The 19-oxygenated $\Delta^4$-3-oxo-steroids, which are readily accessible by the present process, render the manufacture of 19-nor-steroids possible in an extremely simple manner without the necessity of first aromatizing the ring A.

According to the present process a $\Delta^4$-3-oxo-6$\beta$:19-oxido-steroid is treated with reducing agents and, if desired, a resulting $\Delta^5$-3-oxo-steroid is converted into a $\Delta^4$-3-oxo-steroid in which—if desired, after oxidizing a hydroxyl group present in position 19 in known manner—the C–19 atom is eliminated.

The starting materials may contain in position 19 also a hydroxyl or oxo group, that is to say, that there may also be used hemiacetals of 6$\beta$-hydroxy-19-oxo-steroids or 19:6$\beta$-lactones of 6$\beta$-hydroxy-steroid-19-acids. The starting materials belong to the spirostane, androstane, pregnane, cholane, cholestane, stigmastane and cardanolide series and may contain in the ring system, more especially in one or several of the positions 1, 2, 3, 4, 5, 7, 8, 9, 11, 12, 14, 15, 16, 17, 20 and 21, further substituents, such as free or functionally converted oxo groups, esterified or etherified hydroxyl groups, alkyl (for example methyl) groups and/or halogen atoms. Functionally converted oxo groups are ketalized oxo groups or oxo groups converted into enol derivatives, for example enol ethers or enol esters. Furthermore, the starting materials may also contain double bonds or oxido groups, for example in positions 4:5, 9:11 or 16:17.

The starting materials are obtained by the process described in applications Serial No. 122,657, filed July 10, 1961, and Serial No. 122,654, filed July 10, 1961, by reacting a compound containing a positive monovalent halogen, or a heavy metal acylate having an oxidizing action, particularly lead tetraacylate, with a 3-oxygenated 19-unsubstituted 6$\beta$-hydroxy-steroid and forming the $\Delta^4$-3-keto group by methods known per se. In the first mentioned process such conditions are chosen for the reaction with the mentioned oxidation agent as bring about homolytic cleavage of the 6-hypohalites formed. As compounds containing positive, monovalent iodine, there are preferably used chlorine, bromine and iodine derivatives such, for example as N-halogencarboxylic acid amides and imides, for example N-chloracetamide, N-bromacetamide, N-chlorsuccinimide, N-bromosuccinimide, N-iodosuccinimide, 1:3-dibromo-5:5-demethylhydantoin, and also cyanogen chloride chlorine monoxide, cyanogen bromide and cyanogen iodide. The use of hypohalous acids and their derivatives, for example alkyl-hypohalites, such as tertiary butylhypochlorite, tertiary butylhypobromite, is particularly advantageous. Alkylhypoiodites may be prepared, for example, from heavy metal oxides, such as mercuric oxide, silver oxide, lead oxide and the like, with iodine and alcohols. The process may be performed, for example, by dissolving or suspending the starting material in a solvent inert towards the oxidizing agent, for example a hydrocarbon, adding lead tetraacetate, iodine and a weak base, for example calcium carbonate, and heating the reaction mixture with stirring under atmospheric or superatmospheric pressure. The reaction may also be carried out in an analogous manner with iodine and a silver acylate, or iodine and a mercuric acylate, for example an acetate, or with the complexes formed from these reagents. Especially suitable solvents are saturated cyclic hydrocarbons, such as cyclohexane, methylcyclohexane and dimethylcyclohexane, but aromatic hydrocarbons, such as benzene, or halogenated hydrocarbons, such as carbon tetrachloride, hexachloro butadiene, or mixtures of these solvents, may also be used. The reaction time needed depends on the temperature or on the solvent used. Non-polar solvents favour homolytic cleavage of the hypohalites as compared with the heterolytic cleavage which would lead to 6-ketones. The reaction is performed at a raised temperature, for example between 50 and 150° C., and is accelerated by irradiation of the reaction solution with visible and/or ultraviolet light.

According to the second-mentioned process the starting materials are reacted, for example in the above-mentioned solvents and at an analogous temperature and under similar pressure conditions with a heavy metal acylate having an oxidizing action. Lead tetraacetate is preferably used.

In the resulting 6$\beta$:19-oxido-steroids the 6$\beta$:19-oxido group may be oxidized, particularly before the $\Delta^4$-3-oxo group is formed, to hemiacetals of 6$\beta$-hydroxy-19-oxo-steroids or 19:6$\beta$-lactones of 6$\beta$-hydroxy-steroid-19-acids. Strong oxidizing agents are used for this purpose, for example ruthenium tetroxide.

Particularly valuable starting materials are $\Delta^4$-3-oxo-6$\beta$:19-oxido compounds of the androstane, pregnane and spirostane series, for example:

$\Delta^4$-3:17-dioxo-6$\beta$:19-oxido-androstene,
$\Delta^4$ - 3- oxo - 6$\beta$:19 - oxido - 17$\beta$ - hydroxy - androstene and its esters,
$\Delta^4$ - 3 - oxo - 6$\beta$:19 - oxido - 17$\beta$ - hydroxy - 17$\alpha$ - alkyl-, -17$\alpha$ - alkenyl- and -17$\alpha$ - alkinyl - androstenes, more especially the -17$\alpha$-methyl-, -17$\alpha$-ethyl, -17$\alpha$-isobutyl, -17$\alpha$-butyl, -17$\alpha$-allyl, -17$\alpha$vinyl-, -17$\alpha$-ethinyl-, 17$\alpha$-(2-methyl)-ethinyl-compounds and their esters.

Further mention deserve $\Delta^4$-3:20-dioxo-6$\beta$:19-oxido-pregnene,
$\Delta^4$-3:20-dioxo-6$\beta$:19-oxido-21-hydroxy-pregnene and its esters,
$\Delta^4$ - 3:20 - dioxo - 6$\beta$:19 - oxido - 17$\alpha$:21 - dihydroxy - pregnene and its esters,
$\Delta^4$-3:20-dioxo-6$\beta$:19-oxido-17$\alpha$-hydroxy-pregnene and its esters,
$\Delta^4$-3:20-dioxo-6$\beta$:19; 16:17$\alpha$-bisoxido-pregnene,
The 18:20-lactone of $\Delta^4$-3-oxo-6$\beta$:19-oxido-20$\beta$-hydroxy-pregnene-18-acid,
$\Delta^4$-3-oxo-6$\beta$:19-oxido-spirostene, and similar compounds.

The acid radicals in the above-mentioned esters are primarily those of aliphatic, cycloaliphatic, araliphatic or aromatic carboxylic acids containing 1 to 15 carbon atoms, for example formates, acetates, propionates, butyrates, trimethylacetates, oenanthates, caproates, decanoates, cyclopentylpropionates, valerates, benzoates, furoates, hexahydrobenzoates, phenylpropionates, trifluoroacetates, ethyl-carbonates, methyl-carbonates, and similar acid radicals.

Particularly suitable for the reduction of the present invention are metallic reducing agents, more especially such as are capable of converting the $\Delta^4$-3-oxo-grouping during the splitting reaction into a $\Delta^{3:5}$-enolate. Especially suitable are metals of groups 1 and 2 of the periodic system, if desired in combination with compounds giving off hydrogen, for example alkali metals such as sodium, potassium or lithium, alkaline earth metals such as calcium, more especially in the form of a solution in liquid ammonia or in an amine such as ethylamine, isopropylamine, ethylenediamine or the like, if desired with addition of a diluent, such as ether, tetrahydrofuran or dioxane. For the industry the reduction with zinc is of special importance, whereby zinc enolates are formed accompanied by the opening of the oxide ring. As solvents there are used alcohols or with advantage a lower aliphatic carboxylic acid such as acetic or propionic or similar acids, if desired with addition of a diluent such as benzene, dioxane or the like. After hydrolysis of the enolates, there are obtained, depending on the reaction temperature, $\Delta^5$-3-oxo-19-hydroxy-steroids or directly $\Delta^4$-3-oxo-19-hydroxy-steroids. The $\Delta^5$-3-oxo compounds can be isomerized in known manner with acidic or alkaline agents to form the $\Delta^4$-3-oxo compounds. Alternatively, the reduction may be performed by simple heating with active zinc in a suitable solvent, for example toluene, xylene or the like. When the reduction is carried out with zinc in a carboxylic acid anhydride, for example in acetic anhydride, $\Delta^4$-3-oxo-19-acetoxy-steroids are formed.

The $\Delta^4$-3-oxo-19-hydroxy-steroids formed by splitting with zinc and acid may be esterified, if desired, in position 19. For this purpose there are preferably used reactive derivatives of the acids listed above.

According to another method of opening the $6\beta:19$-oxide ring the $\Delta^4$-3-oxo-$6\beta:19$-oxides are treated with chromium$^{+2}$ salts such as chromous chloride or chromous acetate in a water-miscible solvent, such as aqueous dioxane, or in glacial acetic acid.

If desired, further substituents may be introduced in the 19-hydroxy-$\Delta^4$-3-ketones; thus, for example, acetylenes or alkyl-metal compounds may be added on to $\Delta^4$-3:17-dioxo-19-hydroxy-androstene, advantageously after having esterified or etherified the 19-hydroxyl group and, optionally, after having protected the $\Delta^4$-3-keto grouping by ketalization or enol ether formation, after which the protective groups are again removed from the resulting 17$\beta$-hydroxy-17$\alpha$-alkinyl-androstenes or -17$\alpha$-alkyl-androstenes.

For conversion of the $\Delta^4$-3-oxo-19-hydroxy-steroids obtained by the present process into 19-nor-steroids they are treated, for example, in known manner with strong alkalies such as hydroxides or alcoholates of alkali metals. It is, however, of advantage to oxidize the 19-hydroxyl group to the 19-oxo or 19-acid group before elimination of the angular 19-carbon atom, for example with chromic acid/pyridine complex or with chromium trioxide in glacial acetic acid or in acetone+sulfuric acid. The $\Delta^4$-3:19-dioxo compounds give off formic acid even under a mild treatment with an alkali, and the decarboxylation of $\Delta^4$-3-oxo-19-acid is even easier to perform. As is known, decarboxylation by heating in pyridine produces predominantly $\Delta^{5(10)}$-3-oxo-19-nor compounds which are then converted into $\Delta^4$-3-oxo-19-nor-steroids in known manner, for example by treatment with an acid.

Another way of eliminating the 19-carbon atom is heating the $\Delta^4$-3-oxo-19-hydroxy-steroid compound with a ketone and an aluminium alcoholate or magnesium alcoholate, for example with cyclohexanone, a quinone, benzophenonone and aluminium isopropylate, tertiary butylate or phenolate in a suitable solvent such as benzene or toluene.

The following examples illustrate the invention.

Example 1

A solution of 1.0 gram of $\Delta^4$-3:17-dioxo-6$\beta$:19-oxido-androstene in 20 cc. of glacial acetic acid is mixed with 25 grams of zinc dust (activated by washing with dilute acetic acid, water and glacial acetic acid) and the whole is stirred for 20 minutes at 25–30 C. The unconsumed zinc is then suctioned off, the filter residue is rinsed with glacial acetic acid and the filtrate is concentrated in a water-jet vacuum at 25 to 30° C. The residue is taken up in chloroform, and the solution is washed with water and sodium bicarbonate solution, dried and evaporated in a water-jet vacuum. By washing the crystalline residue with a mixture of ether and petroleum ether, there are obtained 640 mg. of $\Delta^5$-3:17-dioxo-19-hydroxy-androstene melting at 168 to 170° C.

When a chloroform solution of this compound is treated for 5 minutes with hydrogen chloride gas and then washed until it is neutral, there is obtained an almost quantitative yield of $\Delta^4$-3:17-dioxo-19-hydroxy-androstene which melts at 170–171° C. after recrystallization from acetone+hexane; the melt then solidifies again and has a melting point of 181° C.

When the reaction described above is carried out with zinc for 10 minutes at 90–100° C., the primarily formed $\Delta^5$-3-ketone undergoes rearrangement even under the reaction conditions and gives rise directly to $\Delta^4$-3:17-dioxo-19-hydroxy-androstene melting at 170–171° C.

Example 2

A solution of 1.0 gram of $\Delta^4$-3:17-dioxo-6$\beta$:19-oxido-androstene in 30 cc. of acetic anhydride is treated with 25 grams of activated zinc dust and heated with stirring for 5 minutes at 130° C. The unconsumed zinc is then filtered off and the filtrate is evaporated to dryness in a water-jet vacuum. The residue is taken up in chloroform, washed with sodium bicarbonate solution and with water, and the dried chloroform solution is evaporated to dryness. The residue (0.95 gram) contains amorphous $\Delta^4$-3:17-dioxo-19-acetoxy-androstene whose infra-red spectrum is characterized by the absence of hydroxyl bands, but it contains strong bands at 5.75/5.80$\mu$ (acetate+17-ketone), 5.98$\mu$ ($\Delta^4$-3-ketone) and 8.12$\mu$ (acetate).

Example 3

500 mg. of $\Delta^4$-3:20-dioxo-6$\beta$:19-oxido-pregnene (6$\beta$:19-oxido-progesterone) are reduced as described in Example 1 with zinc in glacial acetic acid at 90–100° C., to yield $\Delta^4$-3:20-dioxo-19-hydroxy-pregnene (19-hydroxy-progesterone) which melts at 173–174° after recrystallization from methylene chloride+hexane. Optical rotation $[\alpha]_D = +184°$ (in chloroform).

Analogous reduction with zinc of 620 mg. of $\Delta^4$-3:20-dioxo-6$\beta$:19-oxido-17$\alpha$-acetoxy-pregnene at 90° C. yields 450 mg. of $\Delta^4$-3:20-dioxo-17$\alpha$-acetoxy-19-hydroxy-pregnene.

Example 4

A solution of 1.30 grams of 19-hydroxy-progesterone in 30 cc. of pyridine is added to a solution of 2.6 grams of chromium trioxide in 25 cc. of water and 50 cc. of pyridine. The mixture is heated while being stirred for one hour at 60° C., cooled, poured over ice, repeatedly extracted with ether, and the extracts are successively washed with water, dilute hydrochloric acid, water, sodium bicarbonate solution and with water, dried, and the ethereal solution is evaporated in a water-jet vacuum, to yield 1.25 grams of crude 19-oxo-progesterone melting at 139.5–140.5° C. The pure compound, obtained by recrystallization from ether+petroleum ether, melts at 140 to 142° C. Optical rotation $[\alpha]_D^{27} = +249.4°$ C. (in chloroform). The infra-red spectrum (in methylene chloride) contains bands, inter alia, at 3.63, 5.86 (with shoulder at 5.80$\mu$), 5.96, 6.16, 7.36, 8.16, 8.28, 8.60 and 11.51$\mu$.

Analogous oxidation of 450 mg. of Δ⁴-3:20-dioxo-17α-acetoxy-19-hydroxy-pregnene yields 395 mg. of Δ⁴-3:19:20-trioxo-17α-acetoxy-pregnene.

*Example 5*

8 cc. of caprylchloride are stirred within 2 minutes at 10 to 15° C. into a solution of 12.2 grams of 6β:19-oxidotestosterone in 36 cc. of pyridine. The cooling is then removed and the mixture is stirred on for 30 minutes, then treated with ice and ice water, stirred for 2 hours and taken up in benzene. The benzene solution is washed with 2 N-hydrochloric acid and then with ice-cold sodium bicarbonate solution of 5% strength and dried with sodium sulfate. Evaporation under vacuum yields 17.5 grams of Δ⁴-3-oxo-6β:19-oxido-17β-decanoyloxy-androstene as a pale oil.

A solution of 8.75 grams of this crude product in 8.75 cc. of benzene is stirred into a paste of 250 grams of zinc dust (activated by washing with dilute acetic acid and then with concentrated acetic acid) in glacial acetic acid. The reaction mixture is stirred for 1½ hours at 17 to 24° C., diluted with 400 cc. of benzene, the excess zinc is suctioned off and rinsed with benzene. The benzene solution is washed with water and then with ice-cold sodium bicarbonate solution, dried with sodium sulfate and evaporated under vacuum.

The residue contains as main product Δ⁵-3-oxo-17β-decanoyloxy-19-hydroxy-androstene; it is dissolved in 50 cc. of chloroform, treated with 5 cc. of concentrated hydrochloric acid and shaken for 5 minutes at 0 to 5° C., then separated, and the chloroform layer is washed with sodium bicarbonate solution, dried and evaporated in a water-jet vacuum. Yield: 8.2 grams of crystalline Δ⁴-3-oxo-17β-decanoyloxy-19-hydroxy-androstene which melts at 99 to 100° C. after having been recrystallized from ether.

When in this example caprylchloride is replaced by hydrocinnamylchloride and the oily 6:19-oxido-testosterone-β-phenyl-propionic acid ester is subjected to reduction with zinc dust for 4 to 5 hours at 18 to 23° C., an equally good yield of Δ⁴-3-oxo-17β-(β-phenyl-propionyloxy)-19-hydroxy-androstene melting at 131° C. is obtained. The Δ⁴-3-oxo-17β-(β-phenyl-propionyloxy)-19-acetoxy-androstene, prepared from the latter product with acetic anhydride in a pyridine solution, melts at 98° C. after crystallization from alcohol.

*Example 6*

A solution of 2.20 grams of 19-hydroxy-progesterone in 110 cc. of acetone is cooled to 0° C. and 11.0 cc. of a solution, diluted with water to 50.0 cc., of 13.3 grams of chromium trioxide in 11.5 cc., of concentrated sulfuric acid are stirred in. The whole is stirred for another 40 minutes at 0–5° C., a solution of 110 grams of crystalline sodium acetate in 170 cc. of water is added and the mixture is extracted with benzene. The benzene extracts are washed with water, dried and evaporated in a water-jet vacuum. Crystallization of the residue (2.0 grams) from methylene chloride+acetone+petroleum ether yields the pure progesterone-19-acid melting at 136 to 136.5° C. Optical rotation $[\alpha]_D = +237°$ (in chloroform). In the ultra-violet spectrum a maximum appears at 244 mμ ($\epsilon=12,150$). The infra-red spectrum (in methylene chloride) contains bands inter alia at 2.85, 5.87 (with shoulder at 5.77μ), 5.96, 6.76, 7.36, 8.12 and 8.58μ.

Analogous oxidation of 17α-acetoxy-19-hydroxy-progesterone gives rise to 17α-acetoxy-progesterone-19-acid.

716 mg. of progesterone-19-acid are treated in a mixture of 10 cc. of methanol and 40 cc. of ether with an excess of an ethereal solution of diazomethane. After 15 minutes the reacted mixture is evaporated in a water-jet vacuum, the residue is dissolved in ether, filtered and the filtrate evaporated; the residue is crystallized from methylene chloride+ether+petroleum ether, to yield 653 mg. of progesterone-19-acid methyl ester which on recrystallization melts at 141 to 142° C. Optical rotation $[\alpha]_D = +234°$ (in chloroform). Ultra-violet spectrum: maximum at 242 mμ ($\epsilon=14,900$). Infra-red spectrum (in methylene chloride): bands inter alia at 5.79, 5.87, 5.98, 6.18, 7.37, 8.50 and 8.61μ.

A solution of 100 mg. of progesterone-19-acid in 2 cc. of methanol is treated with 0.15 cc. of concentrated hydrochloric acid and refluxed for 30 minutes. 5 cc. of water are then added, the methanol is distilled off in a water-jet vacuum and extracted with ether. The solution is washed with dilute sodium bicarbonate solution and with water, dried and evaporated. One recrystallization yields 50 mg. of 19-nor-progesterone melting at 144 to 145° C. Optical rotation $[\alpha]_D = +147°$.

By an analogous reaction 17α-acetoxy-progesterone-19-acid yields 17α-acetoxy-19-nor-progesterone.

*Example 7*

A solution of 2 grams of 19-hydroxy-testosterone-phenyl-propionate in 20 cc. of pyridine is added while cooling to 2 grams of chromium trioxide in 100 cc. of pyridine and the mixture is stirred for one hour at 20 to 25° C., then diluted with 500 cc. of benzene and stirred for 10 minutes with 50 grams of anhydrous sodium bicarbonate. The benzene solution is filtered off and freed from chromium compounds with the aid of a short column of alumina, then washed with 2 N-hydrochloric acid, dried with sodium sulfate and evaporated in vacuum. Recrystallization from ether yields 0.9 gram of Δ⁴-3:19-dioxo-17β-(β-phenyl-propionyloxy)-androstene melting at 108 to 110° C.

Chromatography on silica gel of the mother liquor of the 19-oxo compound yields, in addition to 0.4 gram of pure aldehyde, 0.2 gram of Δ⁵⁽¹⁰⁾-3-oxo-17β-(β-phenyl-propionyloxy)-19-nor-androstene as a colorless oil.

*Example 8*

6 cc. of an aqueous chromic acid solution which contains in 100 cc. 26.7 grams of chromium trioxide and 23 cc. of pure sulfuric acid is stirred into a cold solution of 2 grams of Δ⁴-3-oxo-17β-(β-phenyl-propionyloxy)-19-hydroxy-androstene in 200 cc. of acetone. The mixture is stirred for another 30 minutes at 10 to 15° C., whereupon the excess chromic acid is decomposed by adding 20 cc. of isopropanol. After another 10 minutes at 15° C. the separated chromium salts are dissolved by adding 70 cc. of water and the solution is diluted with 100 cc. of methylene chloride. The dark aqueous layer is then separated and the organic solution is washed with 3×100 cc. of water and the aqueous layers are extracted with 2×100 cc. of methylene chloride. The organic solutions are dried, evaporated in a water-jet vacuum and further dried in a high vacuum, to yield 1.9 grams of Δ⁴-3-oxo-17β-(β-phenyl-propionyloxy)-androstene-19-acid which is dissolved in ether and esterified with ethereal diazomethane solution. Yield: 2.1 grams of crude Δ⁴-3-oxo-17β-(β-phenyl-propionyloxy)-androstene-19-acid methyl ester which melts at 112° C. after having been purified over a column of silica gel and crystallized from ether+pentane.

1 gram of the crude Δ⁴-3-oxo-17β-(β-phenyl-propionyloxy)-androstene-19-acid described above is refluxed in 2 cc. of tertiary butanol with 0.1 cc. of 12 N-hydrochloric acid for 15 minutes on a bath maintained at 110° C. The reaction solution is cooled, diluted with benzene and ether, and this organic solution is washed with ice-cold sodium bicarbonate solution of 5% strength. Drying and evaporation under vacuum yields a crude product which is dissolved in a 1:1-mixture of benzene and ether and filtered through a column of alumina. The column retains a small amount of 19-nor-testosterone, and by evaporating the filtrate there is obtained 0.8 gram of Δ⁴-3-oxo-17β-(β-phenyl-propionyloxy)-19-nor-androstene which on recrystallization from a small amount of ether melts at 95° C.

Example 9

A solution of 3.7 grams of $\Delta^4$-3-oxo-17$\beta$-decanoyloxy-19-hydroxy-androstene in 370 cc. of acetone is cooled to 10° C. and 11 cc. of an aqueous chromic acid solution containing in 100 cc. 26 grams of chromium trioxide and 23 cc. of concentrated sulfuric acid is stirred in. The mixture is stirred on for 30 minutes at 10 to 15° C. and the excess chromic acid is then decomposed by adding 40 cc. of isopropanol. After a further 10 minutes at 10 to 15° C. the reaction mixture in diluted with 400 cc. of benzene, the supernatant solution is decanted from the dark residue and washed with a mixture of 50 cc. of water and 100 cc. of ammonium sulphate solution of 45% strength, then with 2×50 cc. of water and once with 100 cc. of ammonium sulfate solution of 45% strength, dried over sodium sulfate and evaporated under vacuum, to yield 3.7 grams of $\Delta^4$-3-oxo-17$\beta$-decanoyloxy-androstene-19-acid. A solution of 2.7 grams of this crude product in 54 cc. of tertiary butanol is treated with 2.7 cc. of concentrated hydrochloric acid and refluxed at the boil for 15 minutes. The cooled reaction solution is diluted with benzene, the aqueous layer is separated and the organic layer is washed with ice-cold sodium bicarbonate solution until the washings run neutral, dried with sodium sulfate and exaporated in vacuum. The residue is dissolved in a 1:1-mixture of benzene and ether, filtered through an alumina column and evaporated, to yield 2.2 grams of $\Delta^4$-3-oxo-17$\beta$-decanoyloxy-19-nor-androstene which melts at 38° C. after having been recrystallized from a small amount of n-pentane at −5° C.

Example 10

A solution of 4.0 grams of $\Delta^4$-3-oxo-6$\beta$:19-oxido-17$\beta$-hydroxy-androstene in 20 cc. of glacial acetic acid is added to a paste prepared from glacial acetic acid and 160 grams of zinc dust activated by washing with aqueous acetic acid and then with anhydrous acetic acid. While cooling, the mixture is stirred for 35 minutes at 25 to 30° C.; the excess zinc is then suctioned off and rinsed with glacial acetic acid. The filtrate is cautiously evaporated under reduced pressure. The residue contains $\Delta^5$-3-oxo-17$\beta$:19-dihydroxyandrostene; it is taken up in chloroform and agitated for 5 minutes with 12 N-hydrochloric acid. The chloroform solution is washed with sodium bicarbonate solution, dried with sodium sulfate and evaporated, to yield 3.4 grams of $\Delta^4$-3-oxo-17$\beta$:19-dihydroxy-androstene which melts at 197° C. after having been recrystallized from acetone.

Example 11

A solution of 10 grams of $\Delta^4$-3:17-dioxo-19-hydroxy-androstene in 1 liter of acetone is treated at 10° C. with 30 cc. of an aqueous chromic acid solution containing in 100 cc. 27 grams of chromium trioxide and 23 cc. of concentrated sulfuric acid and the mixture is stirred for 30 minutes at 10 to 15° C. The excess chromic acid is decomposed with isopropanol, the reaction mixture diluted with 1 liter of benzene and the undissolved salts are filtered off the organic solution which is then washed with 3×50 cc. of water with addition of a small amount of ammonium sulfate, then washed once with ammonium sulfate solution of 43% strength, twice dried over sodium sulfate and evaporated in vacuum. Yield: 10 grams of $\Delta^4$-3:17-dioxo-androstene-19-acid which, after having been recrystallized from ether, melts at 146° C. with decomposition. When an ethereal-methanolic solution of said acid is mixed with ethereal diazomethane solution, its methyl ester melting at 136 to 138° C. is obtained.

When the isomeric $\Delta^5$-3:17-dioxo-19-hydroxy-androstene is oxidized as described above instead of the $\Delta^4$-3:17-dioxo-19-hydroxy-androstene, the resulting main product is $\Delta^5$-3:17-dioxo-androstene-19-acid which can be esterified with diazomethane to yield its methyl ester melting at 241 to 243° C.

Example 12

A solution of 1.0 gram of $\Delta^4$-3:17-dioxo-19-hydroxy-androstene in 50 cc. of toluene and 10 cc. of cyclohexane is dried by distilling off 10 cc. of solvent. In the course of 40 minutes the boiling solution is treated dropwise with a solution of 1.2 grams of aluminium isopropylate in 50 cc. of toluene, cooled, diluted with benzene and ether, washed with 2 N-sulfuric acid, water, sodium bicarbonate solution and water, and the organic solution is dried and evaporated in a water-jet vacuum. Crystallization of the residue from ether yields 500 mg. of starting material. The residue of the mother liquor is chromatographed on 60 grams of silica gel. The fractions eluted with 9:1-mixture of benzene and ether yield $\Delta^4$-3:17-dioxo-19-nor-androstene melting at 169 at 171° C. Optical rotation $[\alpha]_D = +135°$ (in chloroform).

Example 13

1.8 grams of $\Delta^4$-3:17-dioxo-19-acetoxy-androstene are dissolved in a mixture of 2.0 cc. of orthoformic acid ethyl ester, 0.1 cc. of absolute alcohol and 10 cc. of dioxane and, after adding 0.5 cc. of a mixture of 5 cc. of dioxane and 0.25 cc. of concentrated sulfuric acid, allowed to stand for 20 minutes at 20–25° C. The reaction mixture is then poured into a solution of 5 grams of sodium acetate in 50 cc. of water and extracted with ether. From the dried ethereal solution there are obtained by evaporation 1.91 grams of crude $\Delta^{3:5}$-3-ethoxy-19-acetoxy-17-oxo-androstadiene in the form of a pale yellow oil. The crude product is dissolved in 50 cc. of toluene and, after the addition of a solution prepared from 2.0 grams of potassium and 50 cc. of tertiary amyl alcohol, the air above the reaction mixture is expelled with dry nitrogen. A week current of pure, dry acetylene is then introduced for 12 hours with stirring. The reaction solution is then diluted with water, acidified with hydrochloric acid and the volatile portions removed by distillation with steam. The precipitated product is taken up in methylene chloride, the extracts washed with sodium bi-carbonate and water, dried and evaporated. The resulting crude product which contains $\Delta^4$-3-oxo-19-acetoxy-17$\beta$-hydroxy-17$\alpha$-ethinyl-androstene is dissolved in 50 cc. of methanol and, after the addition of 250 mg. of potassium carbonate and 10 cc. of water, stirred for 14 hours at room temperature. The $\Delta^4$-3-oxo-17$\alpha$-ethinyl-17$\beta$:19-dihydroxy-androstene formed is isolated by diluting the eraction solution with water and extraction with methylene chloride. There are obtained 1.60 grams of crude product.

A solution of 1.31 grams of $\Delta^4$-3-oxo-17$\alpha$-ethinyl-17$\beta$:19-dihydroxy-androstene in 100 cc. of acetone is cooled to −15° C. 2.00 cc. of a solution of 2.67 grams of chromium trioxide and 2.3 cc. of concentrated sulfuric acid made up to 10.0 cc. with water are then slowly added dropwise while stirring vigorously. After 20 minutes the reaction solution is diluted with 70 cc. of water and extracted several times with benzene. The benzene-solutions washed with water are dried and evaporated at 50° C. bath temperature at a water-jet vacuum. There are obtained 1.02 grams of crude $\Delta^4$-3-oxo-17$\beta$-hydroxy-17$\alpha$-ethinyl-androstene-19-acid.

By esterifying the acid with diazo-methane there is obtained $\Delta^4$-3-oxo-17$\beta$-hydroxy-17$\alpha$-ethinyl-androstene-19-acid methyl ester.

250 mg. of the free acid are heated in 10 cc. of pyridine for 1 hour at the boil, then evaporated to dryness at a water-jet vacuum, and the residue (235 mg.) crystallized from aqueous methanol. There are obtained 200 mg. of $\Delta^{5(10)}$-3-oxo-17$\alpha$-ethinyl-17$\beta$-hydroxy-androstene melting at 169–170° C.; optical rotation $[\alpha]_D = +108°$.

Example 14

A solution of 1.2 grams of Δ⁴-3-oxo-17α-ethinyl-17β:19-dihydroxy-androstene in 15 cc. of pyridine is added with ice-cooling and stirring to an oxidation solution prepared from 40 cc. of pyridine, 10 cc. of water and 1.0 gram of chromium trioxide. The reaction mixture is then stirred for 90 minutes at 15–20° C. It is then diluted with benzene, washed several times with water, and the aqueous solution extracted again with benzene. There are obtained 910 mg. of a crude product which contains Δ⁴:3:19-dioxo-17α-ethinyl-17β-hydroxy-androstene.

What is claimed is:

1. Process for the manufacture of 19-oxygenated steroids, consisting of treating a Δ⁴-3-oxo-6β:19-oxido-steroid with a member selected from the group consisting of a metallic reducing agent and a chromium II salt and isomerizing any resulting Δ⁵-3-oxo-steroid into a Δ⁴-3-oxo-steroid by the action of a member selected from the group consisting of an acidic agent and an alkaline agent.

2. Process as claimed in claim 1, wherein reduction is carried out with zinc and a lower fatty acid.

3. Process as claimed in claim 1, consisting of treating Δ⁴-3-oxo-6β:19-oxido-17β-decanoyloxy-androstene with zinc and glacial acetic acid, oxidizing in the resulting Δ⁴-3-oxo-19-hydroxy-17β-decanoyloxy-androstene the 19-hydroxy group by the action of chromium trioxide and sulfuric acid and eliminating in the compound obtained the 19-carbon atom by the action of an acid.

4. Process as claimed in claim 1, consisting of treating Δ⁴-3:17-dioxo-6β:19-oxido-androstene with zinc and glacial acetic acid, reacting after acetylation the resulting Δ⁴-3:17-dioxo-19-acetoxy-androstene with orthoformic acid ethyl ester, treating the obtained Δ³·⁵-3-ethoxy-19-acetoxy-17-oxo-androstadiene with acetylene, hydrolysing the compound obtained into the Δ⁴-3-oxo-17β:19-dihydroxy-17α-ethinyl-androstene, oxidizing in the latter the 19-hydroxy group by the action of chromium trioxide and sulfuric acid and eliminating in the compound obtained the 19-carbon atom by the action of pyridine to form Δ⁵⁽¹⁰⁾-3-oxo-17β-hydroxy-17α-ethinyl-19-nor-androstene.

5. Process as claimed in claim 1, consisting of treating a 6β:19-oxido-progesterone with zinc and glacial acetic acid and oxidizing the resulting 19-hydroxy-progesterone with chromium trioxide and pyridine to form a 19-oxo-progesterone.

6. A compound of the formula:

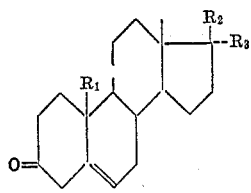

in which $R_1$ stands for a member selected from the group consisting of hydroxymethyl, lower alkanoyloxymethyl, formyl, carboxy and carbo-lower alkoxy, $R_2$ represents a member selected from the group consisting of hydroxy and the acyl radical of a carboxylic acid containing from 1 to 15 carbon atoms and $R_3$ stands for a member selected from the group consisting of hydrogen, lower alkyl, lower alkenyl and lower alkinyl.

7. A compound of the formula:

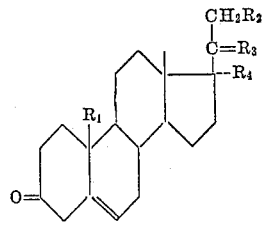

in which $R_1$ stands for a member selected from the group consisting of hydroxymethyl, lower alkanoyloxy-methyl, formyl, carboxy and carbo-lower alkoxy, $R_2$ and $R_4$ represent a member selected from the group consisting of hydrogen, hydroxy and the acyl radical of a carboxylic acid containing from 1 to 15 carbon atoms and $R_3$ stands for a member selected from the group consisting of oxo, lower alkylenedioxy, hydrogen together with hydroxy and hydrogen together with the acyl radical of a carboxylic acid containing from 1 to 15 carbon atoms.

8. Δ⁴-3-oxo-17α-ethinyl-17β-hydroxy-androstene-19-oic-acid.

9. Δ⁴-3-oxo-17α-ethinyl-17β-hydroxy-androstene-19-oic-acid methyl ester.

10. Δ⁴-3:19-dioxo-17α-ethinyl-17β-hydroxy-androstene.

11. Δ⁴-3-oxo-17β-(β-phenylpropionyloxy)-androstene-19-oic-acid.

12. Δ⁴-3-oxo-17β-(β-phenylpropionyloxy)-androstene-19-oic-acid methyl ester.

13. Δ⁴-3-oxo-17β-decanoyloxy-androstene-19-oic-acid.

14. Δ⁴-3:20-dioxo-17α-acetoxy-pregnene-19-oic-acid.

15. Δ⁴-3:20-dioxo-17α-acetoxy-pregnene-19-oic-acid methyl ester.

16. Δ⁵-3:17-dioxo-19-hydroxy-androstene.

17. Δ⁵-3-oxo-17β:19-dihydroxy-androstene.

18. Δ⁵-3-oxo-17β-decanoyloxy-19-hydroxy-androstene.

19. Δ⁵-3:17-dioxo-androstene-19-oic-acid.

20. Δ⁵-3:17-dioxo-androstene-19-oic-acid methyl ester.

References Cited in the file of this patent

UNITED STATES PATENTS

| | | |
|---|---|---|
| 2,819,276 | Mihina | Jan. 7, 1958 |
| 2,819,277 | Colton | Jan. 7, 1958 |
| 2,966,444 | Hasegawa et al. | Dec. 27, 1960 |
| 3,014,931 | Nishikawa et al. | Dec. 26, 1961 |
| 3,033,862 | Ringold et al. | May 8, 1962 |

OTHER REFERENCES

Ehrenstein et al.: J. Org. Chem. 24, 2006–2012 (December 1959).

Drill et al.: Recent Progress in Hormone Research, vol. XIV (1958), Academic Press Inc., New York, pages 29–76.